Jan. 26, 1937.  W. R. KONKLE  2,069,153
METHOD OF MAKING LUBRICATION FITTINGS
Original Filed Oct. 5, 1934
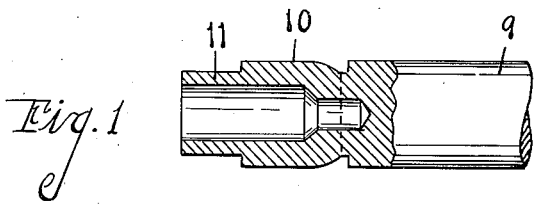
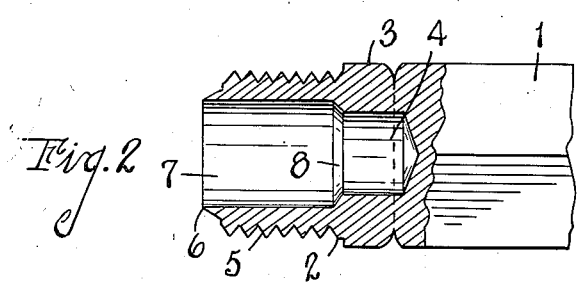
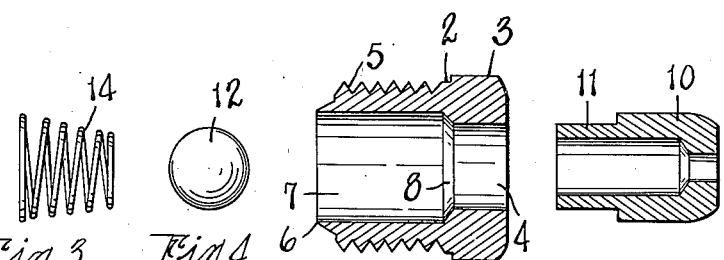 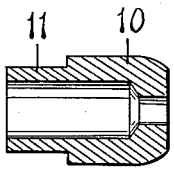
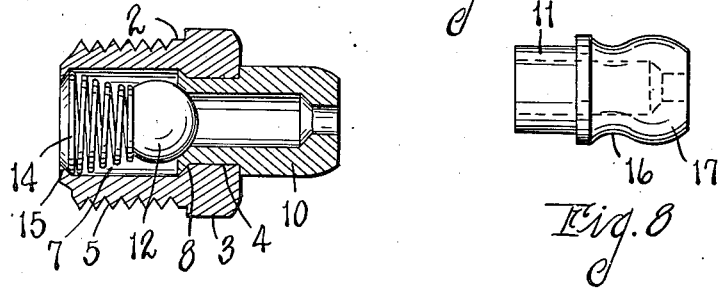 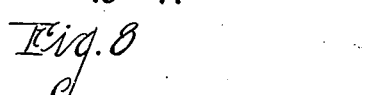
INVENTOR.
Walter R. Konkle
BY
Chappell & Earl
ATTORNEYS Patented Jan. 26, 1937

2,069,153

UNITED STATES PATENT OFFICE 2,069,153

METHOD OF MAKING LUBRICATION FITTINGS

Walter R. Konkle, Albion, Mich., assignor to Decker Screw Products Company, Albion, Mich.

Original application October 5, 1934, Serial No. 746,947. Divided and this application March 16, 1935, Serial No. 11,469

9 Claims. (Cl. 29—157.1)

This application is a division of my application, Serial No. 746,947, filed October 5, 1934, for Lubrication fittings and method of making same.

The main objects of this invention are:

First, to provide a lubrication fitting which is well adapted for use in pressure lubricating systems of the type now commonly used in automotive vehicles.

Second, to provide a lubrication fitting of this character which is economical to manufacture and which is efficient in operation.

Third, to provide an improved method of making lubrication fittings, which is economical and which produces a superior fitting.

Fourth, to provide an improved method of seating a valve.

Objects relating to details and economies of the invention will appear from the description to follow. The invention is defined and pointed out in the claims.

A structure which is a preferred embodiment of my invention is illustrated in the accompanying drawing, in which:

Fig. 1 is a fragmentary view partially in side elevation and partially in longitudinal section of a bar of round solid stock having a fitting teat partially cut therefrom in one step of my method.

Fig. 2 is a fragmentary view partially in side elevation and partially in longitudinal section of a bar of hexagonal solid stock having a screw threaded fitting body partially cut therefrom in accordance with another step of my method.

Fig. 3 is a view in side elevation of the valve seating spring.

Fig. 4 is a view in side elevation of the valve ball.

Fig. 5 is a view in longitudinal section of the finished fitting body.

Fig. 6 is a view in longitudinal section of the finished teat.

Fig. 7 is a view in longitudinal section of the completed straight lubrication fitting made in accordance with my invention.

Fig. 8 is a view in side elevation of a modification of the fitting teat.

In making straight lubrication fittings in the past, it has been customary to form the same in an automatic screw machine entirely of hexagonal solid stock, the fitting teat or nose being formed integrally with the head or screw threaded body thereof. Fittings made in this way required about forty pounds of seven-sixteenth inch hexagonal steel to make one thousand. The main purpose of this invention is to reduce the quantity of hexagonal steel used in making the fittings and the total stock and to thereby reduce the cost thereof. Further, in the past, the entire fitting had to be hardened although the only part which needs hardening is the teat. In my invention, I make it possible to caseharden the teat of the fitting separately from the threaded part before assembling the same.

I make my fitting in two parts, which results in a saving of approximately ten per cent in raw material. For the same over-all size for one thousand fittings, my method requires only twenty-eight pounds of seven-sixteenth inch hexagonal steel and eight pounds of one-quarter inch steel. Thus, by confining the body of the fitting to the hexagonal stock, and by using round stock for the teat or nose of the fitting, I greatly reduce the cost of raw material. Other advantages which flow from my method are set forth herein.

Referring to the drawing, I first form from solid hexagonal stock 1 a body 2 having a short hexagonal head part 3 provided with a small central bore 4 and an externally threaded long tubular part 5 terminating in a tapered end portion 6 and provided with a large central bore 7 connected to the small central bore 4 by an inclined shoulder 8. The body is cut from the stock in an automatic screw machine.

Likewise, in an automatic screw machine, I form from solid round stock 9 a tubular teat 10 having a reduced inner end portion 11 adapted to fit the small bore 4 of the body 2. In the drawing, the relative size of the parts is shown greatly enlarged for convenience of illustration, the stock 9 preferably being one-quarter inch round steel and the hexagonal stock 1 being seven-sixteenth inch hexagonal steel. It is understood that these sizes are for straight lubrication fittings of standard size, such fittings being adapted to be used with standard grease guns or equipment, either plain or hydraulic. The teats may be casehardened as desired.

Next, I telescope together the teat 10 and body 2 and insert the metal valve ball 12 on the inner end of the teat within the large bore 7 of the body. The ball is then struck with a tool in a punch press or other machine adapted to press together the ball and teat to cause the ball to expand the inner end of the teat. The result is to form simultaneously an internal annular ball valve seat 13 therein, and upset the inner end of the teat over the inclined shoulder 8 to lock the teat and body in fixed assembled relation. Thus, the ball 12 is seated and the teat and body are secured together in one operation. The use of the ball to form its own valve seat is a highly desirable feature inasmuch as this insures proper seating of the valve in operation and avoids the necessity of a seating operation.

The conical spring 14 is then inserted in the bore 7 with its small end engaging the ball and its large end in sliding engagement with the bore. The spring is compressed so that its outer end is within the bore and the tapered end portion 6 is then turned inwardly to provide an internal annular stop 15 for the outer end of the spring. This is carried out in a stamping or riveting machine turning the tapered end portion inwardly in the desired manner. The internal annular stop 15 provides a support for the entire outer end of the spring and thereby furnishes a complete support for the latter as distinguished from the spaced lug-like supports heretofore employed.

The teat 16 as shown by Fig. 8 is similar to the teat 10 with the exception that the nose 17 of the teat is rounded as shown.

From the above description of my invention, it will be apparent to those skilled in the art that I not only provide a superior fitting, but one which is more economical to manufacture than the previously known type. By making the fitting in two parts, I use less raw material and economize owing to the fact that the teat can be separately casehardened. I also provide a more efficient and effective valve owing to my use of the ball to form its own seat and connect the fitting parts, and the provision of a continuous support for the outer end of the spring.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

It might be mentioned that I have illustrated and described the body as externally threaded. For certain types of fittings and in certain installations, internal threads are preferred or required.

Although I have shown and described a certain specific embodiment of my invention, I am fully aware that many modifications thereof are possible. My invention, therefore, is not to be restricted except in so far as is necessitated by the prior art and by the spirit of the appended claims.

Having thus described my invention, what I claim as new and desire to secure by Letters Patent is:

1. The method of making a straight lubrication fitting of the character set forth, which comprises the steps of forming from solid hexagonal stock a body having a short hexagonal head portion provided with a small central bore, and an externally threaded tubular portion terminating in a tapered end portion and provided with a large central bore connected to said small central bore by an inclined shoulder, forming from solid round stock a casehardened tubular teat having a reduced inner end portion adapted to fit said small bore, telescoping together said teat and body, inserting a metal valve ball on the inner end of said teat within said large bore of the screw body, compressing together said ball and teat to cause the ball to expand the inner end of the teat to simultaneously form an internal ball valve seat therein and upset the inner end of the teat over said inclined shoulder to lock the teat and head portion in fixed assembled relation, inserting a conical spring into said large bore with the small end of the spring engaging said valve ball, and compressing together the ends of said body to cause the tapered end portion of the tubular body to turn over inwardly and provide an annular stop for the outer end of said spring.

2. The method of making a lubrication fitting of the character set forth, which comprises the steps of forming from hexagonal stock a body having a head portion provided with a small central bore, and an externally threaded portion terminating in a tapered end portion and provided with a large central bore connected to said small central bore by an inclined shoulder, forming from solid round stock a casehardened tubular teat having a reduced inner end portion adapted to fit said small bore, telescoping together said teat and body, inserting a metal valve ball on the inner end of said teat within said large bore of the screw body, compressing together said ball and teat to cause the ball to expand the inner end of the teat to simultaneously form an internal ball valve seat therein and upset the inner end of the teat over said inclined shoulder to lock the teat and head portion in fixed assembled relation, inserting a spring engaging said valve ball, and compressing together the ends of said body to cause the tapered end portion of the tubular body to turn over inwardly and provide an annular stop for the outer end of said spring.

3. The method of making a lubrication fitting of the character set forth, which comprises the steps of forming from polygonal stock a body having a head portion provided with a small central bore, and an externally threaded portion provided with a large central bore connected to said small central bore by a shoulder, forming from solid round stock a casehardened tubular teat having a reduced inner end portion adapted to fit said small bore, telescoping together said teat and body, inserting a metal valve ball on the inner end of said teat within said large bore of the body, and compressing together said ball and teat to cause the ball to expand the inner end of the teat to simultaneously form an internal ball valve seat therein and upset the inner end of the teat over said inclined shoulder to lock the teat and body in fixed assembled relation.

4. The method of making a lubrication fitting of the character set forth, which comprises the steps of forming from polygonal stock a body having a head portion provided with a small central bore, and an externally threaded portion provided with a large central bore connected to said small central bore by a shoulder, forming a teat having a reduced inner end portion adapted to fit said small bore, telescoping together said teat and body, inserting a ball on the inner end of said teat within said large bore of the body, and compressing together said ball and teat to simultaneously form an internal valve seat therein and upset the inner end of the teat over said inclined shoulder to lock the teat and body in fixed assembled relation.

5. The method of making a straight lubrication fitting of the character set forth, which comprises the steps of forming a body having a hexagonal head portion provided with a small central bore, and an externally threaded tubular portion terminating in a tapered end portion and provided with a large central bore connected to said small central bore by an inclined shoulder, forming a casehardened tubular teat having a reduced inner end portion adapted to fit said small bore, telescoping together said teat and body, expanding the inner end of the teat to simultaneously form an internal valve seat therein and upset the inner end of the teat over said inclined shoulder to lock the teat and head portion in fixed assembled relation, inserting a valve spring into said large bore, and compressing together the ends of said body to cause the tapered end portion of the tubular body to turn over inwardly and provide an annular stop for the outer end of said spring.

6. The method of making a straight lubrication fitting of the character set forth, which comprises the steps of forming a body having a hexagonal head portion provided with a small central bore, and an externally threaded tubular portion provided with a large central bore connected to said small central bore by an inclined shoulder, forming a teat having a reduced inner end portion adapted to fit said small bore, telescoping together said teat and body, and expanding the inner end of the teat to simultaneously form an internal valve seat therein and upset the inner end of the teat over said inclined shoulder to lock the teat and head portion in fixed assembled relation.

7. The method of making a straight lubrication fitting of the character set forth, which comprises the steps of forming from solid hexagonal stock a tubular body having an internal annular inclined shoulder, forming from solid round stock a casehardened tubular teat having a reduced inner end portion, fitting said teat and body together with said inner end portion telescoped within the body, and with a metal valve ball expanding the inner end of said teat to thereby simultaneously provide a seat for said ball and upset the inner end of the teat over said inclined shoulder to lock the teat and body in fixed assembled relation.

8. The method of making a lubrication fitting of the character set forth, which comprises the steps of forming a tubular body having an internal annular inclined shoulder, forming a casehardened tubular teat having a reduced inner end portion, fitting said teat and body together with said inner end portion telescoped within the body, and expanding the inner end of said teat to thereby upset the inner end of the teat over said inclined shoulder to lock the teat and body in fixed assembled relation.

9. The method of making a lubrication fitting of the character set forth which comprises the steps of forming a tubular body having an internal shoulder and a tubular teat member having a reduced inner end portion, inserting the reduced inner end portion of the teat member into the body member, and using a valve as a tool to expand the inner end of the teat member to thereby upset it over the said shoulder and simultaneously provide a valve seat.

WALTER R. KONKLE.